United States Patent
Huang et al.

(10) Patent No.: US 9,605,164 B2
(45) Date of Patent: Mar. 28, 2017

(54) LOW SOLIDS COATING COMPOSITIONS HAVING POLYUREA RHEOLOGY CONTROL AGENTS, METHODS FOR MAKING SUCH COATING COMPOSITIONS, AND SYSTEMS FOR MAKING SUCH COATING COMPOSITIONS

(71) Applicant: AXALTA COATING SYSTEMS IP CO., LLC, Wilmington, DE (US)

(72) Inventors: Yongqing Huang, Wilmington, DE (US); Gary W. Nickel, Sewell, NJ (US); Renee J. Kelly, Media, PA (US); Sheau-Hwa Ma, West Chester, PA (US); Beatriz E. Rodriguez-Douglas, Garnet Valley, PA (US); Brian E. Priore, Mt. Royal, NJ (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 234 days.

(21) Appl. No.: 14/467,916

(22) Filed: Aug. 25, 2014

(65) Prior Publication Data

US 2015/0105511 A1   Apr. 16, 2015

Related U.S. Application Data

(60) Provisional application No. 61/889,338, filed on Oct. 10, 2013.

(51) Int. Cl.
| | |
|---|---|
| *C08K 5/00* | (2006.01) |
| *C08K 5/21* | (2006.01) |
| *C09D 5/36* | (2006.01) |
| *C09D 7/12* | (2006.01) |

(52) U.S. Cl.
CPC ............... *C09D 7/125* (2013.01); *C08K 5/21* (2013.01); *C09D 5/36* (2013.01); *C08K 5/0041* (2013.01)

(58) Field of Classification Search
CPC . C09D 7/125; C09D 5/36; C08K 5/21; C08K 5/0041
See application file for complete search history.

(56) References Cited

U.S. PATENT DOCUMENTS

| | | | | |
|---|---|---|---|---|
| 5,204,401 | A * | 4/1993 | Anderson, Jr. | C08G 18/283 524/441 |
| 2006/0155020 | A1 * | 7/2006 | Lenges | C08G 18/3228 524/186 |
| 2006/0155021 | A1 | 7/2006 | Lenges et al. | |

FOREIGN PATENT DOCUMENTS

EP   0192304 A1   8/1986

OTHER PUBLICATIONS

DMPA, German Office Action issued in Application No. 10 2014 014 988.9, dated Feb. 2, 2016.

* cited by examiner

*Primary Examiner* — Patrick Niland
(74) *Attorney, Agent, or Firm* — Lorenz & Kopf LLP

(57) ABSTRACT

Low solids coating compositions having polyurea rheology control agents, methods for making such coating compositions, and systems for making such coating compositions are provided. In accordance with an exemplary embodiment, a coating composition with no more than 30 weight percent nonvolatile content includes a colorant, a polyurea rheology control agent comprising polyurea crystals and a moderating resin, a film forming binder resin, and a solvent.

19 Claims, No Drawings

LOW SOLIDS COATING COMPOSITIONS HAVING POLYUREA RHEOLOGY CONTROL AGENTS, METHODS FOR MAKING SUCH COATING COMPOSITIONS, AND SYSTEMS FOR MAKING SUCH COATING COMPOSITIONS

CROSS-REFERENCE TO RELATED APPLICATION

This application claims the benefit of U.S. Provisional Application No. 61/889,338, filed Oct. 10, 2013, which is incorporated herein by reference in its entirety.

TECHNICAL FIELD

The technical field generally relates to coating compositions, methods for making coating compositions, and systems for making coating compositions, and more particularly relates to low solids coating compositions having polyurea rheology control agents, methods for making such coating compositions, and systems for making such coating compositions.

BACKGROUND

The paint and coatings industry is faced with a number of challenges in developing suitable coating compositions that meet both governmental regulations and consumer preferences. One of these challenges is to satisfy the consumer's desire for improved appearance of the coating compositions, particularly with respect to effect coatings. Typically, aluminum flakes are used as pigments to give paint a metallic effect, although pearlescent mica flakes are also used. These flakes have a larger diameter compared to their thickness and typically should lay flat against each other to provide a brilliant appearance. Disorientation of the flakes causes light scatter, resulting in a dark and/or speckled appearance. Disorientation of the flakes can lead to irregular areas of lightness variation in total color impression. This is more obvious for light metallic colors on large body panels. In the coatings industry, this undesired appearance is called mottling.

The flake orientation is influenced by application parameters and rheology properties of the basecoat itself. A skilled sprayer can control flake orientation by changing atomizing air pressure, changing the size of a paint gun nozzle, changing the spraying distance from a substrate, and the like. Coating compositions with good flake control capability, i.e., suitable rheology and viscosity properties, are desirable so that a paint sprayer can easily apply the coating composition without the need to adjust flake orientation.

Another challenge is in the area of environmental regulations. Environmental concerns have resulted in government restrictions of volatile organic compounds (VOCs) in paints and coatings. For example, in the United States, many states have passed or are considering passing legislation limiting VOCs in refinish basecoats to no more than 0.42 kilograms (kg) of VOCs/liter of paint (3.5 pounds of VOCs/gallon of paint). Other countries have or will follow suit. Compliance with these regulations is currently possible by using "exempt" solvents, which are solvents that are not included in the calculation of VOCs. VOC exempt solvents do not cause the formation of ground level ozone (smog), according to environmental chemists. Several of the more commercially useful VOC exempt solvents include acetone, methyl acetate, tertiary butyl acetate (TBAc), and P-chlorobenzotriflouride (PCBTF). Water also is considered an exempt solvent.

For low solids coating compositions, significant amounts of exempt solvents are needed to achieve certain VOC targets. Due to the limitation of choice of solvents and the amount of non-exempt, but preferred, solvents, it becomes more challenging to formulate a coating composition that has both low VOC and that provides suitable rheology and viscosity for good effect color appearance.

Accordingly, it is desirable to provide low solids coating compositions with polyurea rheology control agents that improve the appearance, particularly the orientation of effect pigments, of the coating compositions. In addition, it is desirable to provide methods and systems for making such low solids coating compositions. Furthermore, other desirable features and characteristics will become apparent from the subsequent detailed description and the appended claims, taken in conjunction with the accompanying drawings and this background.

BRIEF SUMMARY

Low solids coating compositions having polyurea rheology control agents, methods for making such coating compositions, and systems for making such coating compositions are provided. In accordance with an exemplary embodiment, a coating composition with no more than 30 weight percent nonvolatile content includes a colorant, a polyurea rheology control agent, a binder solution, and a solvent.

In accordance with another exemplary embodiment, a system for producing a low solids coating composition with no more than 30 weight percent nonvolatile content includes a colorant, a binder solution, a polyurea rheology control agent, and a reducer. The colorant, the binder solution, the polyurea control agent, and the reducer are packaged and/or sold together as a product.

In accordance with a further exemplary embodiment, a method for producing a low solids coating composition includes mixing a colorant, a binder solution, a polyurea rheology control agent, and a reducer in amounts such that the low solids coating composition has no more than 30 weight percent nonvolatile content based on a total weight of the low solids coating composition.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Various embodiments for low solids coating compositions with polyurea rheology control agents and methods and systems for making such low solids coating compositions are described herein. The low solids coating compositions have no more than 30 weight percent nonvolatile content and contain a polyurea rheology control agent. The polyurea rheology control agent aids in the control of the rheology and viscosity of the low solids coating compositions, thus facilitating control of the orientation of aluminum flakes in the compositions. Accordingly, with the presence of the polyurea rheology control agent, the low solids coating compositions exhibit more brilliance and luster due to the ordered orientation of the flakes.

In an exemplary embodiment, the coating compositions contemplated herein are "low solids" coating compositions. As used herein, the term "coating composition" is used to mean any type of coating applied to a substrate. The substrate can be made of metal, plastic or other polymer materials, wood, ceramic, clay, concrete, stone, or other man-made or natural materials. Examples of suitable substrates include, but are not limited to, a vehicle, such as an automobile or truck; a home appliance, such as a refrigerator, a washing machine, a dishwasher, microwave oven, cooking and baking ovens; electronic appliances, such as television sets, computers, electronic game sets, audio and video equipment, recreational equipment, such as bicycles, ski equipment, and all-terrain vehicles; and home or office furniture, such as tables and file cabinets. The substrate can also have one or more existing coating layers. The coating compositions can include primers, sealers, topcoats, clearcoats, basecoats, one- and two-stage coatings, and the like. In the context of vehicle coating, the coating composition can be used both for vehicle original equipment manufacturing (OEM) coatings and for repairing or refinishing coatings of vehicles and vehicle parts. As used herein, the term "solid" refers to nonvolatile components in the coating composition. The term "low solids" means that the total weight percent of nonvolatile components in the coating composition is no more than 30%, for example, no more than 25%, such as no more than 20%.

In an exemplary embodiment, the coating composition contemplated herein includes a colorant. As used herein, the term "colorant" means any material which, when added to a coating, causes a color change. Typically, a colorant can be a dye, or a pigment, or a mixture of dyes, or a mixture of pigments, or a combination thereof can also be used. Metallic flakes, such as aluminum flakes, special effect pigments, such as coated mica flakes, coated aluminum flakes, or a combination thereof can also be used. The colorant can be produced by combining the pigments with resins and solvents. The resins can be of the general class of acrylics, polyesters, alkyds and the like and provide the functions of wetting the pigment, aiding in grinding or mixing, and facilitating paint compatibility. As used herein, the term "paint" refers to a composition with or without pigment. The colorant also may include dispersant polymers of the acrylic and/or polyester type with polar, ionic, aromatic, basic, or acidic functional groups. The dispersant polymers are selected for various functions, for example, wetting and/or stabilizing the pigments in the colorant. The colorant further may include additives functioning as rheology-imparting materials such as bentonite clays or hydrophobic fumed silica to prevent settling and improve suspension of the pigments.

The low solids coating composition further includes a solvent, according to an embodiment. As used herein, the term "solvent" refers to a volatile component in the coating composition. The solvents can be VOC-exempt or non-exempt. The suitable solvents can include ketones, such as acetone, methyl ethyl ketone, methyl isobutyl ketone, methyl amyl ketone, methyl isoamyl ketone, and diisobutyl ketone, esters, such as, ethyl acetate, n-butyl acetate, t-butyl acetate, isobutyl acetate, amyl acetate, and ethyl 3-ethoxy propionate, alcohols such as, ethanol, isopropanol, butanol, pentanol, glycol ethers, such as propylene glycol methyl ether, propylene glycol monomethyl ether acetate, propylene glycol monobutyl ether acetate, aromatic hydrocarbons, such as toluene, xylene, and aromatic 100 or aliphatic hydrocarbons, such as heptane, petroleum naphtha, and VM&P naptha (varnish makers and painter naptha). VOC exempt solvents can be acetone, methyl acetate, t-butyl acetate, P-chlorobenzotrifluoride (PCBTF) or a combination thereof. Water is also a VOC exempt solvent. In solvent-borne coating compositions, water content should be less than 5 wt. %, more preferably less than 2 wt. %, based on the total weight of the coating composition.

In another exemplary embodiment, the coating composition includes a binder solution containing a film-forming binder resin and a solvent. As used herein, the term "resin" means any of a class of nonvolatile, solid or semisolid organic substances that may consist of amorphous mixtures of natural oil obtained directly from certain plants as exudations, or resins prepared by polymerization of simple molecules. Resins suitable for use in the binder solution include, but are not limited to, acrylic resins, polyester resins, and cellulosic resins common in the art. Particularly useful hydroxyl-containing acrylic polymers are composed of polymerized monomers of alkyl methacrylates and alkyl acrylates, each having 1-12 carbon atoms in the alkyl groups, isobornyl methacrylate, isobornyl acrylate, hydroxyl alkyl methacrylate and hydroxyl alkyl acrylate, each having 1-4 carbon atoms in the alkyl group, styrene or any mixture of any of the above monomers. These acrylic polymers have a weight average molecular weight of 2,000 to 50,000 and a glass transition temperature (Tg) of from −20° C. to 100° C. Useful polyesters are the esterification product of one or more aliphatic or aromatic polycarboxylic acids, and one or more aliphatic polyols, but may also incorporate anhydrides, monoacids, monoalcohols, or lactones. Useful carboxylic acid or anhydride components include aliphatic diacids having 0-12 carbon atoms between the acid groups, phthalic anhydride, isophthalic acid, terephthalic acid, hexahydrophthalic anhydride, benzoic acid, and coconut fatty acid. Useful hydroxyl components include aliphatic glycols having 0-6 carbon atoms between the hydroxyl groups, glycerine, trimethylolpropane, pentaerythritol, dimethylolpropionic acid, cyclohexanol, and epsilon-caprolactone. The suitable polyester has a weight average molecular weight ranging from 1500 to 20,000 and a Tg in the range of −50° C. to 100° C. Useful cellulosic resins include the cellulose acetate butyrate types and the cellulose acetate propionate types. The solvent of the binder solution includes, but is not limited to, any of the solvents described above.

The low solids coating composition also contains a polyurea rheology control agent. As noted above, coating compositions with good flake control capability, i.e., suitable rheology and viscosity properties, are desirable so that a paint sprayer can easily apply the coating composition without the need to adjust flake orientation. In conventional low solid basecoats, wax dispersions and silica dispersions have been used to control flake orientation. Besides using rheology control agents, paint formulators have relied on the careful selection of solvent mixtures to control rheology from application to final film formation. However, while trying to lower the VOC contents of coating compositions, the choice of solvents and the amount of non-exempt, but preferred, solvents available for use in the coating compositions as rheology or viscosity controllers becomes limited.

The inventors have found that when a polyurea rheology control agent is included in low solids systems, the rheology and viscosity of the resulting coating compositions improves the orientation of the flakes. The polyurea rheology control agent contemplated herein contains polyurea crystals. In an embodiment, the polyurea crystal suitable for use herein is a reaction product of an amine and an isocyanate. The preferred amine monomer is a primary amine. The amine monomer can be selected from a secondary amine, diamines, ketamine, aldimine or a combination thereof. Examples of primary amines include benzyl amine, ethyl amine, I-propylamine, n-propylamine, I-butylamine, 2-butylamine, t-butylamine, n-pentylamine, 2-methyl-1-butylamine, I-hexylamine, 2-hexylamine, 3-hexylamine, octylamine, decylamine, laurylamine, stearylamine, cyclohexylamine, and aniline. Other suitable amines include alkyl ether amines, such as, for example, 2-aminoethanol alkyl ether, 3-aminopropanol alkyl ether, and 2-aminopropanol alkyl ether. Examples of secondary amines can include, for example, the N-alkyl derivatives of any of the primary amines listed above wherein alkyl means an alkyl radical having in the range of from 1 to 10 carbon atoms. Examples of diamines can include, aliphatic and cycloaliphatic diamines such as, for example, ethylene diamine, 1,2-propylenediamine, 1,3-diaminopropane, 1,4-butanediamine, neopentanediamine, 4,4-diaminodicyclohexylmethane, isophoronediamine, hexamethylenediamine, 1,12-dodecanediamine, piperazine, polyether diamines, polytrimethylene ether diamine or a combination thereof. In some embodiments, combinations of any of the above listed amines can also be suitable. In one embodiment, the amine monomer is benzyl amine. The isocyanate monomer is chosen from a blocked or unblocked aliphatic, cycloaliphatic, heterocyclo, or aromatic di-, tri- or multivalent isocyanate, or a combination thereof. Examples of suitable diisocyanates include 1,6-hexamethylene diisocyanate, 2,2,4-trimethylhexane-1,6-diisocyanate, 2,4,4-trimethylhexane-1,6-diisocyanate, cyclohexyl-1,4-diisocyanate, isophoron diisocyanate, the adduct of 1 molecule of 1,4 butanediol and 2 molecules of isophoron diisocyanate, the adduct of 1 molecule of 1,4-butanediol and 2 molecules of hexamethylene diisocyanate, dicyclohexylmethane-4,4'-diisocyanate, xylylene diisocyanate, 1,3,5-trimethyl-2,4-bis(isocyanatomethyl)benzene, toluene diisocyanate, diphenylmethane-4,4'-diisocyanate, adducts of hexamethylene diisocyanate, adducts of isophoron diisocyanate, and adducts of toluene diisocyanate. Isocyanurate-trimers derived from diisocyanates are also suitable, as are combinations of the isocyanates. Any of the isocyanates mentioned above can be blocked or unblocked. In an embodiment, the isocyanate monomer is 1,6 hexamethylene diisocyanate.

In an exemplary embodiment, the polyurea rheology control agent further contains a moderating resin, which is in the presence of the reaction of the isocyanate and the amine. The moderating resin can be one or more of the aforedescribed resins. Particularly suitable moderating resins include acrylic polymers or polyesters. In an embodiment, the polyurea is produced by mixing one or more of the moderating resins with the amine monomers and then isocyanate monomers are added over time under ambient conditions. The aforementioned process can be typically free from un-reacted isocyanates since an excess amount of amine is normally used. In order to lower the VOCs of the coating composition, it is desired to use VOC exempt solvents. In an exemplary embodiment, the polyurea rheology control agent contains only the VOC exempt solvent t-butyl acetate. The coating composition can contain 0 to 95 wt. % VOC-exempt solvents based on the total weight of the coating composition. In an exemplary embodiment, the coating composition comprises about 13 wt. % solids, and about 65 wt. % VOC-exempt solvents to about 78 wt. % VOC-exempt solvents when including t-butyl acetate.

The low solids coating composition contemplated herein comprises polyurea rheology control agent in a range of from about 0.5 to about 10 wt. %, for example from about 1 to about 9 wt. %, such as from about 1.5 to about 7 wt. %, based on the total weight of the coating composition. In turn, in an embodiment, the polyurea rheology control agent comprises polyurea crystals in a range of from about 1 to about 10 wt. %, for example, from about 2 to about 8 wt. %, such as from about 3 to about 5 wt. %, based on the total weight of the polyurea rheology control agent. In another embodiment, the polyurea rheology control agent comprises polyurea crystals in an amount in the range of from about 0.2 to about 3 wt. %, for example, 0.4 to 2 wt. %, based on the total nonvolatile content of the coating composition.

In a further exemplary embodiment, the low solids coating composition contemplated herein contains a reducer. A reducer is used to reduce the viscosity of the coating composition to a proper viscosity for coating application. The reducer contains one, or more than one, solvent with or without a resin. The solvent and the resin can be any of the solvents and resins described above. In an exemplary embodiment, the reducer contains 100 wt. % solvents based on a total weight of the reducer. In another embodiment, the reducer contains about 95 to 99 wt. % solvents based on a total weight of the reducer. An "unreduced paint" refers to a coating composition before mixing with a reducer.

In addition, the coating composition can include additives, such as those usually used in the paint industry. Examples of such additives are light stabilizers, for example, based on benztriazoles and HALS compounds, flow control agents based on (meth)acrylic homopolymers or silicone oils, rheology imparting materials, such as hydrophobic fumed silica, thickeners, such as cross-linked polycarboxylic acid or polyurethanes, anti-foaming agents, wetting agents, and the like.

In another, optional, embodiment, the low solids coating composition includes a crosslinking component. The term "crosslinking component" refers to a component having "crosslinking functional groups" that are functional groups positioned in each molecule of the component, wherein these functional groups are capable of crosslinking with other functional groups in the coating composition (during the curing step) to produce a coating in the form of cross-linked structures. Suitable crosslinking functional groups can include isocyanate, thioisocyanate, alkylated melamine formaldehyde, acetoacetoxy, carboxyl, primary amine, secondary amine, epoxy, anhydride, ketamine, aldimine, or a workable combination thereof. In an exemplary embodiment, the crosslinking component is isocyanate.

In a further exemplary embodiment, a system for producing a low solids coating composition includes a colorant, a binder solution, a polyurea rheology control agent, a reducer, and, optionally, a crosslinking component, all as described above. These components are packaged and/or sold together and/or otherwise formulated or manufactured to be combined to produce a low solids coating composition as contemplated herein. In another embodiment, the system is packaged with a plurality of colorants so that coating compositions of a variety of colors and special effects can be produced. In an embodiment, the components are packaged and/or sold together as a unit or product.

In a further exemplary embodiment, a method for making a coating composition includes combining a colorant, a binder solution, a polyurea rheology control agent, and a reducer, as contemplated above, in amounts or ratios and sequence according to a predetermined formula for obtaining a coating composition having a predetermined color, special effect, or function. The coating composition can be mixed using any suitable method to combine the ingredients, such as high shear mixing, stirring, agitation, blending, or any combination thereof. In an embodiment, a paint can be formed by combining the colorant, the binder solution, and the polyurea rheology control agent, followed by reducing the paint with the reducer. Alternatively, the reducer can be combined with one or more of the individual components of the paint, such as the colorant, the binder solution, and/or the polyurea rheology control agent, followed by the combination of the rest of the ingredients. While in one embodiment, the coating composition is formed by combining the colorant, the binder solution, the polyurea rheology control agent, and the reducer, it will be appreciated that the solvents, the resins, and other ingredients of these four components may not necessarily be separated into four such components but may be divided among two components, three components, or more than four components and then may be mixed together to form the coating composition. In another embodiment, a crosslinking component is added to the paint to form a pre-cured mixture. The pre-cured mixture then is cured, such as by the application of heat or light.

EXAMPLE I

The following is an example of a refinish basecoat composition and a method for producing a coating composition having a significant amount of VOC-exempt solvents. The examples are provided for illustration purposes only and are not meant to limit the various embodiments contemplated herein in any way.

Acrylic Resin 1

An acrylic polymer solution was prepared by free-radical copolymerization by charging the following constituents into a polymerization reactor equipped with a thermometer, a heating source, a stirrer, a dropping funnel, a nitrogen purge, and a condenser:

|  | wt. % |
|---|---|
| Portion 1 | |
| Methyl amyl ketone | 27.42 |
| Portion 2 | |
| Butyl acrylate monomer | 31.00 |
| Methacrylic acid monomer | 5.00 |
| Isobornyl acrylate monomer | 20.00 |
| Hydroxy ethyl methacrylate monomer | 7.50 |
| Hydroxy propyl methacrylate monomer | 7.50 |
| Styrene monomer | 29.00 |
| Portion 3 | |
| Di-t-butyl-peroxide | 0.55 |
| Methyl amyl ketone | 30.85 |
| TOTAL | 158.82 |

Portion 1 was added to the reactor and heated to its reflux temperature. Portion 2 was premixed and then added at a uniform rate to the reactor over 195 minutes while the resulting reaction mixture was maintained at its reflux temperature. Portion 3 was premixed and added to the reactor over a period of 200 minutes at a uniform rate while maintaining the reaction mixture at its reflux temperature. The reaction mixture was held at its reflux temperature for an additional 2 hours.

The resulting acrylic polymer solution had a polymer solids content of about 63 wt. % and a Gardner-Holdt viscosity of about Z.

Acrylic Resin 2

An acrylic polymer solution was prepared by free-radical copolymerization by charging the following constituents into a polymerization reactor equipped with a thermometer, a heating source, a stirrer, a dropping funnel, a nitrogen purge, and a condenser:

|  | wt. % |
|---|---|
| Portion 1 | |
| T-butylacetate | 13.70 |
| Portion 2 | |
| Methyl methacrylate monomer | 14.60 |
| N-butyl acrylate monomer | 14.60 |
| 2-Ethylhexyl methacrylate monomer | 11.70 |
| Hydroxy ethyl methacrylate monomer | 11.70 |
| Styrene monomer | 5.90 |
| T-butylacetate | 1.20 |
| Portion 3 | |
| Vazo ® 67 | 3.40 |
| T-butylacetate | 23.20 |
| TOTAL | 158.82, | where Vazo® 67 is 2,2'azobis-(2-methylbutyronitrile) available from E.I. DuPont de Nemours and Co., Wilmington, Del. Portion 1 was added to the reactor and heated to its reflux temperature. Portion 2 was premixed and then added at a uniform rate to the reactor over 360 minutes while the resulting reaction mixture was maintained at its reflux temperature. Portion 3 was premixed and simultaneously added to the reactor with Portion 2. Portion 3 was added over a period of 390 minutes. The reaction mixture was held at its reflux temperature for an additional 60 minutes and then cooled to room temperature.

The resulting acrylic polymer solution had a polymer solids content of about 60 wt. % and a Gardner-Holdt viscosity of about Y.

Polyurea Rheology Control Agent (RCA)

Approximately 1.7 wt. % of benzyl amine, available from BASF of Florham Park, N.J. was mixed with about 1.34 wt. % of 1,6 hexamethylene diisocyanate in the presence of 96.36 wt. % of the Acrylic Resin #2. The reaction was stirred for 5 minutes. The polyurea rheology control agent contained 3.0 wt. % of polyurea crystals based on the total weight of the polyurea rheology control agent.

Polyester Resin

A copolyester polyol was synthesized by esterifying dimethylolpropionic acid, pentaerythritol, and epsilon-caprolactone. A 12-liter reactor equipped with a mechanical stirrer, a thermocouple, and a short path distillation head with a water separator under nitrogen purge was charged with 2063.4 g. dimethylolpropionic acid (DMPA), 167.1 g. pentaerythritol (PE), 31.0 g. tin (II) 2-ethylhexanoate, and 108.3 g. xylene. The reaction mixture was heated to its reflux temperature and the water of reaction was collected from the water separator. The reaction progress was monitored by the amount of water collected, and the reaction temperature was not allowed to exceed 185° C. An additional 20 g of xylene was added throughout the reaction to maintain the reflux temperature below 185° C. When the amount of water collected approached theoretical (277 g), acid number measurements were used to determine the end point, which was an acid number of less than 5. At a measured acid number of 1.7, the reactor was allowed to cool to 120° C. Then 4126.8 g of epsilon-caprolactone was added slowly over a 15-20 minute period through an addition funnel. The reactor was held at 120° C. until the solids exceeded 95%. Then the reactor was allowed to cool to 90° C. and the resulting polymer solution was thinned with 1391.8 g methyl amyl ketone. Forced air was used to cool the reactor to below 50° C.

The polyester resin had a number average molecular weight Mn of 5035 (determined by GPC using polystryine as a standard with a SEC high Mw column) The polymer solution had about 80 wt. % solids content, a Gardner Holdt viscosity of about V, and the final acid number was 2.1 corrected for solids. The polyester resin was further reduced to 65.5 wt. % solids content by the further addition of methyl amyl ketone.

Binder Solutions (BS)

The composition of each binder solution is listed in Table 1. During Stage I, all ingredients were mixed homogeneously until becoming clear solutions. The ingredients in Stage II were homogeneously mixed into the Stage I solutions. Binder solution 1 (BS_1) has no polyurea rheology control agent and therefore no polyurea crystals and binder solution 2 (BS_2) has 5.5 wt. % polyurea rheology control agent based on total weight of the binder solution 2 and therefore 0.17 wt. % polyurea crystals based on the total weight of the binder solution 2.

TABLE 1

Composition of Binder Solutions

| Ingredients | BS_1 wt. % | BS_2 wt. % |
| --- | --- | --- |
| Stage I | | |
| Acetone | 10.6 | 10.6 |
| T-butyl acetate | 29.9 | 29.9 |
| Diisobutyl ketone | 4.5 | 4.5 |
| Ethyl 3-ethoxypropionate | 3.2 | 3.2 |
| CAB resin 381-0.5 | 3.9 | 3.9 |
| CAB resin 381-0.1 | 2.3 | 2.3 |
| Stage II | | |
| P-chlorobenzotriflouride (PCBTF) | 12.0 | 12.0 |
| Acrylic polymer 1 | 13.6 | 13.6 |
| Polyester resin | 3.8 | 3.8 |
| Resamin ® HF480 | 1.0 | 1.0 |
| Byk ® 361N | 0.3 | 0.3 |
| Acrylic polymer 2 | 14.9 | 9.3 |
| Polyurea rheology control agent | 0.0 | 5.6 |
| Total | 100.0 | 100.0 | where CAB resin 381-0.5 and 381-0.1 are cellulose acetate butyrates available from Eastman Chemical Co. of Kingsport, Tenn., Resamin HF480 is a carbamic resin available from Allnex of Belgium, and Byk® 361N is a polyacrylate surface additive available from Byk of Germany.

Reducer

The reducer was a mixture of 96.0 wt. % P-chlorobenzotrifluoride (PCBTF) and 4.0 wt. % acetone, based on the total weight of the reducer.

Read-to-Spray Paints

Two samples of unreduced paint were prepared by mixing 819J™ tint, available from Axalta Coating Systems Co. of Wilmington, Del., with the binder solutions BS_1 and BS_2 according to the formulas of Table 2. The reducer was then added into the unreduced paint, which was stirred until homogeneous samples were obtained.

TABLE 2

Compositions of Ready-to-Spray Paints

| Ingredients | Sample 1 wt. % | Sample 2 wt. % |
| --- | --- | --- |
| 819J ™ | 7.0 | 7.0 |
| BS_1 | 35.7 | |
| BS_2 | | 35.7 |
| Reducer | 57.3 | 57.3, | where Sample 1 contained 13.2 wt. % solids based on the total weight of Sample 1. Sample 2 contained 13.2 wt. % solids based on the total weight of Sample 2, 2.0 wt. % polyurea rheology control agent based on the total weight of Sample 2, 0.06 wt. % polyurea crystals based on the total weight of Sample 2, and 0.5 wt. % polyurea crystals based on the total weight of the solids of Sample 2.

Sample 1 and Sample 2 were sprayed on 12×36 inch coil coated aluminum substrate panels (purchased from ACT Test Panels LLC, Hillsdale, Mich.) using a SprayMation machine (Model 310926, made by SprayMation Inc. Fort Lauderdale, Fla.) at two different spray distance of 5.5 and 6.0 inches, respectively. The spray distance is defined as the distance between a spray gun nozzle and the surface of the panels. The samples were put on as medium wet coats during each pass until hiding was achieved. The basecoated panels were air dried for 10 minutes. About 50.8 micrometer (2 mils) thickness of clearcoat LE5100S™ (available from Axalta Coating Systems Co., Wilmington, Del.) was sprayed on the dried basecoat panels. The clearcoated panels were then baked at 60° C. (140° F.) for 30 minutes. The colors of the panels were measured by a ChromaVision® MA 100 color matching system available from Axalta Coating Systems Co. The mottling values of the tested panels were measured by a Cloud-runner instrument (BYK-Gardner GmbH, Bad Tölz, Germany).

Metallic "Travel" and "Flop" are usually used to characterize flake orientation. While using the same effect pigments and illumination conditions, the bigger the value of "Travel" and "Flop", the better the flake orientation. The term "Travel" is mathematically defined as Travel=L15−L110. The term "Flop" is mathematically defined as Flop=$2.69*(L15-L110)^{1.11}/(L45)^{0.86}$. In both equations, L15, L45 and L110 are the lightness or light intensity measured at aspecular angle of 15 degrees, 45 degrees and 110 degrees, respectively. The angle is determined by reference to the specular angle which is 45 degree from normal. As noted above, the term "mottling" is used to describe the irregular area of lightness variation of an effect color appearance. According to the recommendation from BYK-Gardner GmbH, M15 is used to characterize uniformity of the effect color appearance. When M15 is larger than 6, the mottling appearance is considered as "clearly noticeable". When M15 is from 4.5 to 6, the mottling appearance is considered "visible". When M15 is below 4.5, the mottling appearance is considered as "hard to recognize". M15 is mottling appearance measured at aspecular angle of 15 degree. The angle is determined by reference to the specular angle which is 45 degrees from normal.

Table 3 shows that Sample 2, which contained 2.0 wt. % of polyurea rheology control agent based on the total weight of the ready-to-spray composition, had better flake orientation (bigger values in both Travel and Flop) and less mottling than Sample 1 which did not contain polyurea rheology control agent. Since the mottling values of Sample 2 were significantly better than Sample 1 at both spray distances, adding polyurea rheology control agent improved the application consistency.

TABLE 3

| | Basecoat | Polyurea crystal (wt. %) | Distance Inches | Travel | Flop | Mottling 15° angle |
|---|---|---|---|---|---|---|
| Panel 1 | Sample 1 | 0 | 5.5 | 102.5 | 14.1 | 6.5 |
| Panel 2 | Sample 2 | 0.5 | 5.5 | 103.5 | 14.4 | 4.5 |
| Panel 3 | Sample 1 | 0 | 6.0 | 101.5 | 13.8 | 7.7 |
| Panel 4 | Sample 2 | 0.5 | 6.0 | 104.5 | 14.4 | 5.2 | where the weight percent of the polyurea crystals is based on the total solids of the Samples 1 and 2.

EXAMPLE II

The following is an example of refinish basecoats having solids less than 15 wt. % and different amounts of polyurea rheology control agents. The examples are provided for illustration purposes only and are not meant to limit the various embodiments contemplated herein in any way.

Binder Solutions (BS)

The compositions of each binder solution containing polyurea rheology control agents are listed in the Table 4. During Stage I, all ingredients were mixed homogeneously until clear solutions were obtained. The ingredients in Stage II were homogeneously mixed into the Stage I solutions. Binder solution 3 (BS_3) had 7.9 wt. % polyurea rheology control agent and binder solution 4 (BS_4) had 17.2 wt. % polyurea rheology control agent based on total weight of the respective binder solutions. Therefore, the weight percents of polyurea crystals in binder solutions 3 and 4 were 0.2 wt. % and 0.5 wt. %, respectively, based on the total weight of the respective binder solutions.

TABLE 4

Compositions of Binder Solutions

| Ingredients | BS_3 wt. % | BS_4 wt. % |
|---|---|---|
| Stage I | | |
| Acetone | 10.6 | 10.6 |
| T-butyl acetate | 29.9 | 29.9 |
| Diisobutyl ketone | 4.5 | 4.5 |
| Ethyl 3-ethoxypropionate | 3.2 | 3.2 |
| CAB resin 381-0.5 | 3.9 | 3.9 |
| Stage II | | |
| P-chlorobenzotriflouride (PCBTF) | 12.0 | 12.0 |
| Acrylic polymer 1 | 13.6 | 13.6 |
| Polyester resin | 3.8 | 3.8 |
| Resamin ® HF480 | 1.0 | 1.0 |
| Byk ® 361N | 0.3 | 0.3 |
| Acrylic polymer 2 | 9.3 | 0 |
| Polyurea rheology control agent | 7.9 | 17.2 |
| Total | 100.0 | 100.0 |

Ready-to-Spray Paints

Two samples of unreduced paint were prepared by mixing 819J™ tint, available from Axalta Coating Systems Co. of Wilmington, Del., with the binder solutions 3 and 4 according to the formulas of Table 4 until homogenous mixtures were formed. The reducer was then added into the unreduced paints, which were stirred until homogeneous paints were obtained. The compositions of ready-to-spray Sample 3 and Sample 4 are listed in Table 5.

TABLE 5

Compositions of Ready-to-Spray Paints

| Ingredients | Sample 3 (wt. %) | Sample 4 (wt. %) |
|---|---|---|
| 819J ™ | 7.0 | 7.0 |
| BS_3 | 35.7 | |
| BS_4 | | 35.7 |
| Reducer | 57.3 | 57.3 | where Sample 3 contained 12.9 wt. % solids based on the total weight of Sample 3, 2.8 wt. % polyurea rheology control agent based on the total weight of Sample 3, 0.08 polyurea crystals based on the total weight of Sample 3, and 0.7 polyurea crystals based on the total weight of the solids of Sample 3. Sample 4 contained 12.9 wt. % solids based on the total weight of Sample 4, 6.1 wt. % polyurea rheology control agent based on the total weight of Sample 4, 0.18 wt. % polyurea crystals based on the total weight of Sample 4, and 1.4 wt. % polyurea crystals based on the total weight of the solids of Sample 4.

Sample 3 and Sample 4 were sprayed on 12×36 inch coil coated aluminum substrate panels (purchased from ACT Test Panels LLC, Hillsdale, Mich.) using a SprayMation machine (Model 310926, made by SprayMation Inc. Fort Lauderdale, Fla.) at a spray distance of 5.5 inches. The samples were put on as medium wet coats during each pass until hiding was achieved. The sample panels were air dried for 10 minutes. About 50.8 micrometer (2 mils) thickness of clearcoat LE5100S™ (available from Axalta Coating Systems, Wilmington, Del.) was applied on the dried panels. The clearcoated panels were then baked at 60° C. (140° F.) for about 30 minutes.

The mottling values of Sample 3 and Sample 4, in Table 5, are around 4, which indicates the mottling effect is visually hard to recognize or mottle-free. From both mottling value and visual observation, the appearance of Sample 3 and Sample 4 was slightly more uniform than Sample 2 under the same spray distance as used in Example I. This example demonstrated that choosing the proper amount of polyurea rheology control agent in low solids coating composition improved flake orientation and helped to achieve mottle-free appearance.

TABLE 6

| | Basecoat | Polyurea Crystal (wt. %) | Distance inches | Mottling 15° angle |
|---|---|---|---|---|
| Panel 1 | Sample 3 | 0.7 | 5.5 | 4.2 |
| Panel 2 | Sample 4 | 1.4 | 5.5 | 4.3 | where the weight percent of the polyurea crystals is based on the total solids of the Samples 3 and 4.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodi-

What is claimed is:

1. A coating composition with no more than 30 weight percent nonvolatile content, the coating composition comprising:
   a colorant;
   a polyurea rheology control agent, wherein the polyurea rheology control agent comprises a reaction product of an amine and an isocyanate, and wherein the isocyanate is selected from 1,6-hexamethylene diisocyanate, 2,2,4-trimethylhexane-1,6-diisocyanate, 2,4,4-trimethylhexane-1,6-diisocyanate, adduct of hexamethylene diisocyanate, xylene diisocyanate, 1,3,5-trimethyl-2,4-bis(isocyanatomethyl)benzene, toluene diisocyanate, diphenyl methane-4,4'-diisocyanate, adduct of toluene diisocyanate, and a combination thereof, and wherein the amine is selected from benzyl amine, aniline, and a combination thereof;
   a film forming binder resin; and
   a solvent.

2. The coating composition of claim 1, wherein the coating composition has no more than 25 weight percent nonvolatile content, based on a total weight of the coating composition.

3. The coating composition of claim 2, wherein the coating composition has no more than 20 weight percent nonvolatile content, based on the total weight of the coating composition.

4. The coating composition of claim 1, wherein the polyurea rheology control agent is present in the coating composition in an amount in the range of from about 0.5 to about 10 weight percent based on a total weight of the coating composition.

5. The coating composition of claim 4, wherein the polyurea rheology control agent is present in the coating composition in an amount in the range of from about 1.5 to about 7 weight percent based on the total weight of the coating composition.

6. The coating composition of claim 1, wherein the polyurea rheology control agent comprises polyurea crystals in an amount in the range of from about 1 to about 10 wt. % based on a total weight of the polyurea rheology control agent.

7. The coating composition of claim 6, wherein the polyurea rheology control agent comprises the polyurea crystals in an amount in the range of from about 2 to about 8 wt. % based on the total weight of the polyurea rheology control agent.

8. The coating composition of claim 7, wherein the polyurea rheology control agent comprises the polyurea crystals in an amount in the range of from about 2 to about 5 wt. % based on the total weight of the polyurea rheology control agent.

9. The coating composition of claim 1, wherein the polyurea rheology control agent comprises polyurea crystals in an amount in the range of from about 0.2 to about 3 wt. % based on a total nonvolatile content of the coating composition.

10. The coating composition of claim 9, wherein the polyurea rheology control agent comprises the polyurea crystals in an amount in the range of from about 0.4 to about 2 wt. % based on the total nonvolatile content of the coating composition.

11. The coating composition of claim 1, wherein the amine is benzyl amine.

12. The coating composition of claim 1, wherein the amine is aniline.

13. The coating composition of claim 1, wherein the amine is benzyl amine and the isocyanate is 1,6-hexamethylene diisocyanate.

14. The coating composition of claim 1, further comprising a VOC-exempt solvent present in an amount of from about 0 to about 95 wt. % based on a total weight of the coating composition, wherein the VOC-exempt solvent is selected from acetone, methyl acetate, tertiary butyl acetate (TBAc), P-chlorobenzotriflouride (PCBTF), and a combination thereof.

15. The coating composition of claim 14, wherein the VOC-exempt solvent is present in an amount of from about 60 to about 85 wt. % based on the total weight of the coating composition.

16. The coating composition of claim 1, further comprising a crosslinking agent, an ultraviolet light stabilizer, an ultraviolet light absorber, an antioxidant, a hindered amine light stabilizer, a leveling agent, a rheological agent, a thickener, an antifoaming agent, a wetting agent, or any combination thereof.

17. A system for producing a low solids coating composition with no more than 30 weight percent nonvolatile content, the system comprising:
   a colorant;
   a binder solution;
   a polyurea rheology control agent, wherein the polyurea rheology control agent comprises a reaction product of an amine and an isocyanate, and wherein the amine is selected from benzyl amine, aniline, and a combination thereof; and
   a reducer;
   wherein the colorant, the binder solution, the polyurea rheology control agent, and the reducer are packaged and/or sold together as a product.

18. A method for producing a low solids coating composition comprising the steps of:
   mixing a colorant, a binder solution, a polyurea rheology control agent, and a reducer in amounts such that the low solids coating composition has no more than 30 weight percent nonvolatile content based on a total weight of the low solids coating composition, wherein the polyurea rheology control agent comprises a reaction product of an amine and an isocyanate, and wherein the amine is selected from benzyl amine, aniline, and a combination thereof.

19. The method of claim 18, wherein mixing further comprises mixing a crosslinking component with the colorant, the binder solution, the polyurea rheology control agent, and the reducer.

* * * * *